United States Patent
Medina

(10) Patent No.: US 9,772,815 B1
(45) Date of Patent: Sep. 26, 2017

(54) PERSONALIZED OPERATION OF A MOBILE DEVICE USING ACOUSTIC AND NON-ACOUSTIC INFORMATION

(71) Applicant: Knowles Electronics, LLC, Itasca, IL (US)

(72) Inventor: Eitan Asher Medina, Palo Alto, CA (US)

(73) Assignee: Knowles Electronics, LLC, Itasca, IL (US)

( * ) Notice: Subject to any disclaimer, the term of this patent is extended or adjusted under 35 U.S.C. 154(b) by 293 days.

(21) Appl. No.: 14/542,327

(22) Filed: Nov. 14, 2014

Related U.S. Application Data

(60) Provisional application No. 61/904,295, filed on Nov. 14, 2013.

(51) Int. Cl.
| | |
|---|---|
| *G06F 3/048* | (2013.01) |
| *G06F 3/16* | (2006.01) |
| *G06F 3/0346* | (2013.01) |
| *G06F 3/0484* | (2013.01) |

(52) U.S. Cl.
CPC ............ *G06F 3/167* (2013.01); *G06F 3/0346* (2013.01); *G06F 3/04842* (2013.01)

(58) Field of Classification Search
CPC .. G06F 3/017; G06F 3/167; G06F 2203/0381; G06Q 10/10; G06Q 30/0251–30/0269; G06Q 50/00; H04W 4/02; H04W 4/18
See application file for complete search history.

(56) References Cited

U.S. PATENT DOCUMENTS

| | | |
|---|---|---|
| 5,809,471 A | 9/1998 | Brodsky |
| 6,243,476 B1 | 6/2001 | Gardner |
| 6,593,956 B1 | 7/2003 | Potts et al. |

(Continued)

FOREIGN PATENT DOCUMENTS

| | | |
|---|---|---|
| WO | WO2013148588 A1 | 10/2013 |
| WO | WO2014039552 A1 | 3/2014 |

OTHER PUBLICATIONS

International Search Report and Written Opinion dated Jul. 3, 2013 in Patent Cooperation Treaty Application No. PCT/US2013/033727, filed Mar. 25, 2013.

(Continued)

*Primary Examiner* — Claudia Dragoescu
(74) *Attorney, Agent, or Firm* — Foley & Lardner LLP

(57) ABSTRACT

Systems and methods for performing personalized operations of a mobile device are provided. An example method includes determining a user-defined signature has been received. The user-defined signature can include a combination of an acoustic input and non-acoustic input. The method can further include performing, in response to the determination, operations of the mobile device, the operations being associated with the user-defined signature. Exemplary acoustic input includes a voice sound with at least one spoken keyword. The spoken keyword is used to identify the operations. Exemplary non-acoustic input includes motions of the mobile device detected by an accelerometer, a gyroscope, and a magnetometer. Exemplary motions include vibrations of the mobile device, tapping the mobile device, rotations of the mobile device, movements of the mobile device as to draw a figure in a space.

16 Claims, 6 Drawing Sheets

(56) References Cited

U.S. PATENT DOCUMENTS

| | | |
|---|---|---|
| 7,131,136 B2 | 10/2006 | Monroe |
| 8,194,880 B2 | 6/2012 | Avendano |
| 8,326,625 B2 | 12/2012 | Adibi |
| 8,473,287 B2 | 6/2013 | Every et al. |
| 8,577,677 B2 | 11/2013 | Kim et al. |
| 8,712,069 B1 | 4/2014 | Murgia et al. |
| 8,787,587 B1 | 7/2014 | Murgia et al. |
| 8,880,396 B1 | 11/2014 | Laroche et al. |
| 9,185,487 B2 | 11/2015 | Solbach et al. |
| 9,195,994 B1 | 11/2015 | Ellis et al. |
| 2003/0016835 A1 | 1/2003 | Elko et al. |
| 2003/0236604 A1 | 12/2003 | Lu et al. |
| 2004/0044516 A1 | 3/2004 | Kennewick et al. |
| 2004/0052391 A1 | 3/2004 | Bren et al. |
| 2005/0008169 A1 | 1/2005 | Muren et al. |
| 2005/0078093 A1* | 4/2005 | Peterson, Jr. .......... G06F 3/043 345/173 |
| 2005/0212753 A1* | 9/2005 | Marvit .................. G06F 3/017 345/156 |
| 2006/0217977 A1 | 9/2006 | Gaeta et al. |
| 2006/0247927 A1 | 11/2006 | Robbins et al. |
| 2007/0096979 A1 | 5/2007 | Hinnant et al. |
| 2008/0019548 A1 | 1/2008 | Avendano |
| 2008/0173717 A1 | 7/2008 | Antebi et al. |
| 2009/0055170 A1 | 2/2009 | Nagahama |
| 2009/0143972 A1 | 6/2009 | Kitamura et al. |
| 2009/0323982 A1 | 12/2009 | Solbach et al. |
| 2010/0033424 A1 | 2/2010 | Kabasawa et al. |
| 2010/0128881 A1 | 5/2010 | Petit et al. |
| 2010/0128894 A1 | 5/2010 | Petit et al. |
| 2010/0174506 A1 | 7/2010 | Joseph et al. |
| 2010/0312547 A1 | 12/2010 | Van Os et al. |
| 2010/0315905 A1 | 12/2010 | Lee et al. |
| 2010/0318257 A1 | 12/2010 | Kalinadhabhotla |
| 2011/0172918 A1 | 7/2011 | Tome |
| 2011/0239026 A1 | 9/2011 | Kulik |
| 2011/0257967 A1 | 10/2011 | Every et al. |
| 2012/0058803 A1 | 3/2012 | Nicholson |
| 2012/0252411 A1 | 10/2012 | Johnsgard et al. |
| 2013/0106894 A1 | 5/2013 | Davis et al. |
| 2013/0253880 A1 | 9/2013 | Joseph et al. |
| 2013/0297926 A1 | 11/2013 | Eaton et al. |
| 2014/0157402 A1* | 6/2014 | Boss .................. G06F 21/36 726/19 |
| 2014/0244273 A1 | 8/2014 | Laroche et al. |
| 2014/0316783 A1 | 10/2014 | Medina |
| 2014/0342758 A1 | 11/2014 | Aleksy et al. |
| 2015/0012248 A1 | 1/2015 | Meduna et al. |
| 2015/0081296 A1 | 3/2015 | Lee et al. |
| 2015/0247729 A1 | 9/2015 | Meduna et al. |
| 2016/0061934 A1 | 3/2016 | Woodruff et al. |

OTHER PUBLICATIONS

International Search Report and Written Opinion dated Dec. 2, 2013 in Patent Cooperation Treaty Application No. PCT/US2013/058055, filed Sep. 4, 2013.

Vinande et al., "Mounting-Angle Estimation for Personal Navigation Devices," IEEE Transactions on Vehicular Technology, vol. 59, No. 3, Mar. 2010, pp. 1129-1138.

Zhao et al., "Towards Arbitrary Placement of Multi-Sensors Assisted Mobile Navigation System," In Proceedings of the 23rd International Technical Meeting of the Satellite Division of the Institute of Navigation, Portland, OR, Sep. 21-24, 2010, pp. 556-564.

Joseph, Benjamin E. et al., "System and Method for Determining a Uniform External Magnetic Field," U.S. Appl. No. 61/615,327, filed Mar. 25, 2012.

International Search Report and Written Opinion dated Mar. 16, 2016 in Patent Cooperation Treaty Application No. PCT/US2015/067966, filed Dec. 29, 2016.

Laroche, Jean et al., "Noise Suppression Assisted Automatic Speech Recognition", U.S. Appl. No. 12/962,519, filed Dec. 7, 2010.

Medina, Eitan Asher, "Cloud-Based Speech and Noise Processing", US. Appl. No. 61/826,915, filed May 23, 2013.

Laroche, Jean et al., "Adapting a Text-Derived Model for Voice Sensing and Keyword Detection", U.S. Appl. No. 61/836,977, filed Jun. 19, 2013.

Murgia, Carlo, "Continuous Voice Sensing", U.S. Appl. No. 61/881,868, filed Sep. 24, 2013.

Verma, Tony, "Context Aware False Acceptance Rate Reduction", U.S. Appl. No. 14/749,425, filed Jun. 24, 2015.

Vitus, Deborah Kathleen et aL, "Method for Modeling User Possession of Mobile Device for User Authentication Framework", U.S. Appl. No. 14/548,207, filed Nov. 19, 2014.

Non-Final Office Action, dated Jan. 17, 2013, U.S. Appl. No. 12/843,819, filed Jul. 26, 2010.

Final Office Action, dated Aug. 30, 2013, U.S. Appl. No. 12/843,819, filed Jul. 26, 2010.

Notive of Allowance, dated Mar. 4, 2014, U.S. Appl. No. 12/843,819, filed Jul. 26, 2010.

Non-Final Office Action, dated Aug. 23, 2012, U.S. Appl. No. 13/529,809, filed Jun. 21, 2012.

Final Office Action, dated Jan. 30, 2013, U.S. Appl. No. 13/529,809, filed Jun. 21, 2012.

Advisory Action, dated May 14, 2013, U.S. Appl. No. 13/529,809, filed Jun. 21, 2012.

Non-Final Office Action, dated Aug. 30, 2013, U.S. Appl. No. 13/529,809, filed Jun. 21, 2012.

Notice of Allowance, dated Mar. 28, 2014, U.S. Appl. No. 13/529,809, filed Jun. 21, 2012.

Non-Final Office Action, dated Jul. 15, 2015, U.S. Appl. No. 14/216,446, filed Mar. 17, 2014.

Non-Final Office Action, dated Jan. 14, 2016, U.S. Appl. No. 14/629,406, filed Feb. 23, 2015.

Non-Final Office Action, dated Feb. 10, 2016, U.S. Appl. No. 14/216,446, filed Mar. 17, 2014.

Non-Final Office Action, dated Apr. 22, 2016, U.S. Appl. No. 13/849,448, filed Mar. 22, 2013.

Non-Final Office Action, dated Apr. 25, 2016, U.S. Appl. No. 14/666,312, filed Mar. 24, 2015.

* cited by examiner

PERSONALIZED OPERATION OF A MOBILE DEVICE USING ACOUSTIC AND NON-ACOUSTIC INFORMATION

CROSS-REFERENCE TO RELATED APPLICATIONS

The present application claims the benefit of U.S. Provisional Application No. 61/904,295, filed on Nov. 14, 2013. The present application is related to U.S. patent application Ser. No. 12/860,515, filed Aug. 20, 2010, U.S. patent application Ser. No. 12/962,519, filed Dec. 7, 2010, U.S. Provisional Application No. 61/814,119, filed Apr. 19, 2013, U.S. Provisional Application Ser. No. 61/826,900, filed May 23, 2013, Provisional Application No. 61/826,915, filed May 23, 2013, U.S. Provisional Application No. 61/836,977, filed Jun. 19, 2013, and U.S. Provisional Application No. 61/881,868, filed Sep. 24, 2013. The subject matter of the aforementioned applications is incorporated herein by reference for all purposes.

FIELD

The present application relates generally to mobile devices providing user interfaces, and, more specifically, to systems and methods for performing personalized operations of a mobile device.

BACKGROUND

A vendor of a mobile device will typically make fixed choices as to what functions of the mobile device are exposed to receive user-defined input, such as passwords or voice commands. Accordingly, a user must follow a prescribed procedure for a particular type of input in order to cause a desired behavior by the mobile device. This approach limits the level of personalization available to the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of methods and systems for performing personalized operations and training the mobile device are provided. According to an example embodiment, a method includes determining that a signature has been received. The signature can include a combination of an acoustic input and non-acoustic input. The method can further include performing, in response to the determination, operations of the mobile device associated with processing of a signature. In some embodiments, the acoustic input can include a voice sound captured by at least one microphone of the mobile device. The voice sound can include at least one spoken keyword. The at least one spoken keyword can be used to select the operations.

In some example embodiments, the non-acoustic input includes one or more motions of the mobile device. For example, the motions can include vibrations of the mobile device due to being held by a hand, vibrations of the mobile device due to being tapped, one or more rotations of the mobile device, and a movement of the mobile device to draw a figure in space. The non-acoustic input can be detected by one or more sensors associated with the mobile device. The sensors can include one or more of the following: an accelerometer, a gyroscope, a magnetometer, a proximity sensor, and other physical sensors. In certain embodiments, a period of time is allowed between the acoustic input and non-acoustic input.

In some embodiments, determining that the signature has been received includes comparing the acoustic input with a user-defined acoustic input sample and comparing the non-acoustic input with a user-defined non-acoustic input sample. In certain embodiments, the method includes training the mobile device to perform the operations. The method can include receiving a selection of one or more applications and sensor types from a user. The method can further include recording acoustic data and non-acoustic sensor data based at least in part on the selected sensor types. The method can further include generating a user-defined signature based at least in part on the acoustic data and non-acoustic sensor data. The user-defined signature can include a combination of the user-defined acoustic input sample and the user-defined non-acoustic input sample. The method can further include associating the generated signature with the selection of one or more applications.

According to another example embodiment of the present disclosure, the steps of the method for performing personalized operations of a mobile device and training the mobile device can be stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure provides example systems and methods for performing personalized operations of a mobile device and training the mobile device. Embodiments of the present disclosure can be practiced on a plurality of mobile devices. Mobile devices can be portable or stationary.

Mobile devices can include: radio frequency (RF) receivers, transmitters, and transceivers, wired and/or wireless telecommunications and/or networking devices, amplifiers, audio and/or video players, encoders, decoders, speakers, inputs, outputs, storage devices, and user input devices. Mobile devices may include inputs such as buttons, switches, keys, keyboards, trackballs, sliders, touch screens, one or more microphones, gyroscopes, accelerometers, global positioning system (GPS) receivers, and the like. Mobile devices can include outputs, such as LED indicators, video displays, touchscreens, speakers, and the like. In some embodiments, mobile devices may include hand-held devices, such as wired and/or wireless remote controls, notebook computers, tablet computers, all-in-ones, phablets, smart phones, personal digital assistants, media players, mobile telephones, and the like.

Mobile devices can be used in stationary and mobile environments. Stationary environments may include residencies, commercial buildings, or structures. Stationary environments can include living rooms, bedrooms, home theaters, conference rooms, auditoriums, and the like. For mobile environments, the systems may be moving with a vehicle, carried by a user, or be otherwise transportable.

According to an example embodiment, a method for performing operations of a mobile device includes determining that a signature has been received. The signature can include a combination of an acoustic input and non-acoustic input. The method can further include performing, in response to the determination, the operations of the mobile device, the operations being associated with the signature.

An example method for training a mobile device can include receiving a selection of one or more applications and sensor types from a user. The method can further include recording acoustic data and non-acoustic sensor data based at least on the selected sensor types. The method may allow generating a user-defined signature based at least on the acoustic data and non-acoustic sensor data. The user-defined signature can include a combination of the user-defined acoustic input sample and the user-defined non-acoustic input sample. The method can further include associating the generated signature with the selection of one or more applications.

Figure 1:
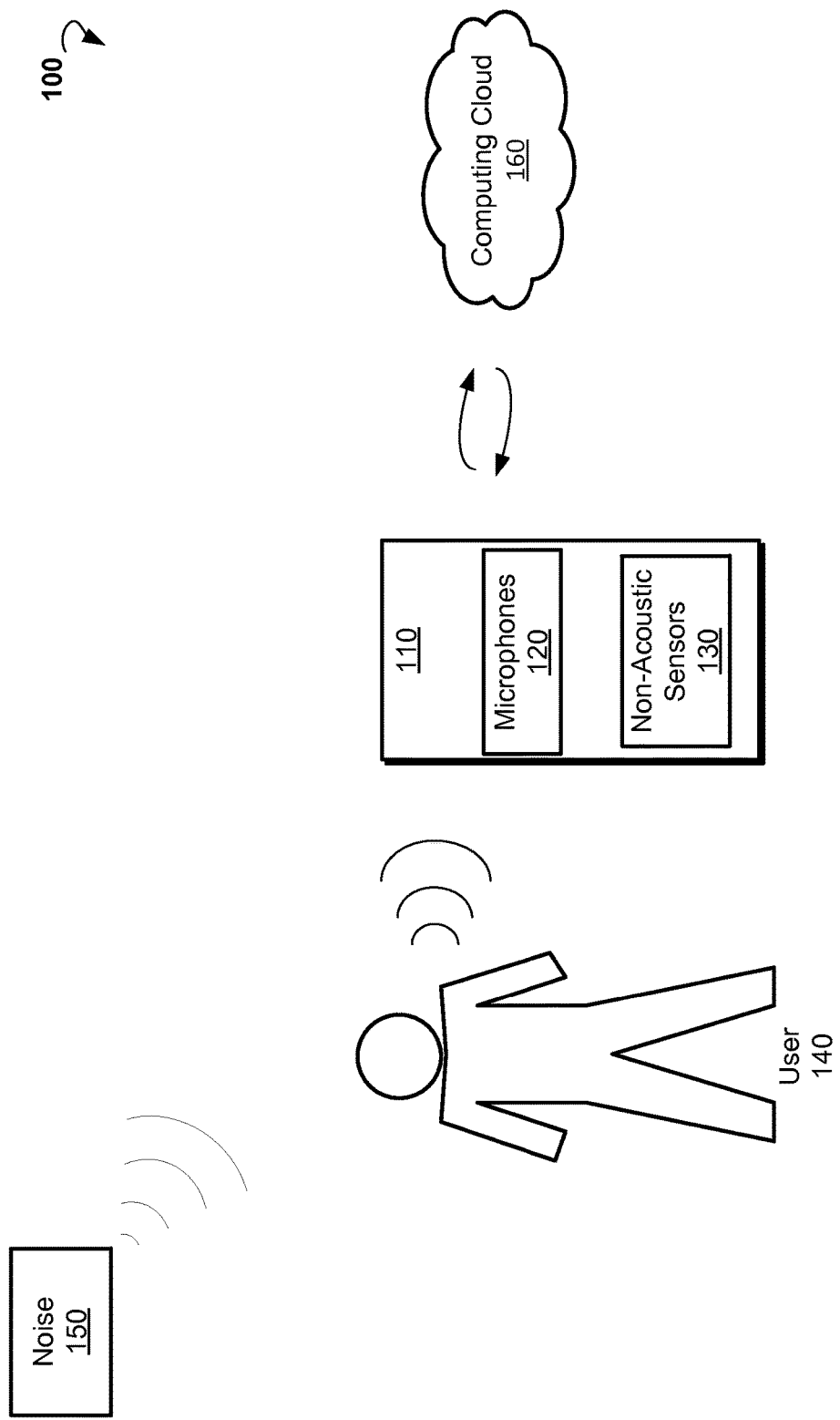
FIG. 1 is block diagram showing an example environment in which various methods for performing operations of a mobile device and various methods for training the mobile device can be practiced.

Referring now to FIG. 1, an environment 100 is shown in which a method for performing operations of a mobile device and method for training the mobile device can be practiced. In example environment 100, a mobile device 110 can be operable to receive at least an acoustic audio signal from a user 140. In some embodiments, the mobile device 110 can receive the audio signal via one or more microphone(s) 120. The mobile device 110 can include non-acoustic sensors 130 (referred to as non-acoustic sensors herein to differentiate from acoustic sensors (e.g., microphones)). The acoustic audio signal and input from the non-acoustic sensors 130 (or various representations thereof) can be processed by the mobile device 110 to perform one or more operations.

In various embodiments, the non-acoustic sensors 130 include an accelerometer, a magnetometer, a gyroscope, an Inertial Measurement Unit (IMU), a temperature sensor, an altitude sensor, a proximity sensor, a barometer, a humidity sensor, a color sensor, a light sensor, a pressure sensor, a Global Positioning System (GPS) module, a beacon, a (video) camera, a WiFi sensor, an ultrasound sensor, an infrared sensor, and a touch sensor. The video camera can be configured to capture still or moving images of an environment. The images captured by the video camera may include pictures taken within the visible light spectrum or within a non-visible light spectrum such as the infrared light spectrum ("thermal vision" images). The non-acoustic sensors 130 may also include variously a bio sensor, a photoplethysmogram (PPG), a Galvanic skin response (GSR) sensor, an internet of things, a social sensor (e.g. sensing various data from social networks), an ion gas analyzer, an electroencephalogram (EEG), and an electrocardiogram (EKG).

The acoustic audio signal can be contaminated by noise 150. Noise sources may include street noise, ambient noise, sound from the mobile device such as audio, speech from entities other than an intended speaker(s), and the like.

In some embodiments, the mobile device 110 can be communicatively coupled to a cloud-based computing resource(s) 160, also referred to as a computing cloud 160. The cloud-based computing resource(s) 160 can include computing resources (hardware and software) available at a remote location and accessible over a network (for example, the Internet). The cloud-based computing resources 160 can be shared by multiple users and can be dynamically re-allocated based on demand. The cloud-based computing resources 160 may include one or more server farms/clusters including a collection of computer servers which can be co-located with network switches and/or routers. In various embodiments, the mobiles devices 110 can be connected to the computing cloud 160 via one or more wired or wireless network(s). The mobile devices 110 can be operable to send data to computing cloud 160, with request computational operations being performed in the computing cloud 160, and receive back the result of the computational operations.

Figure 2:
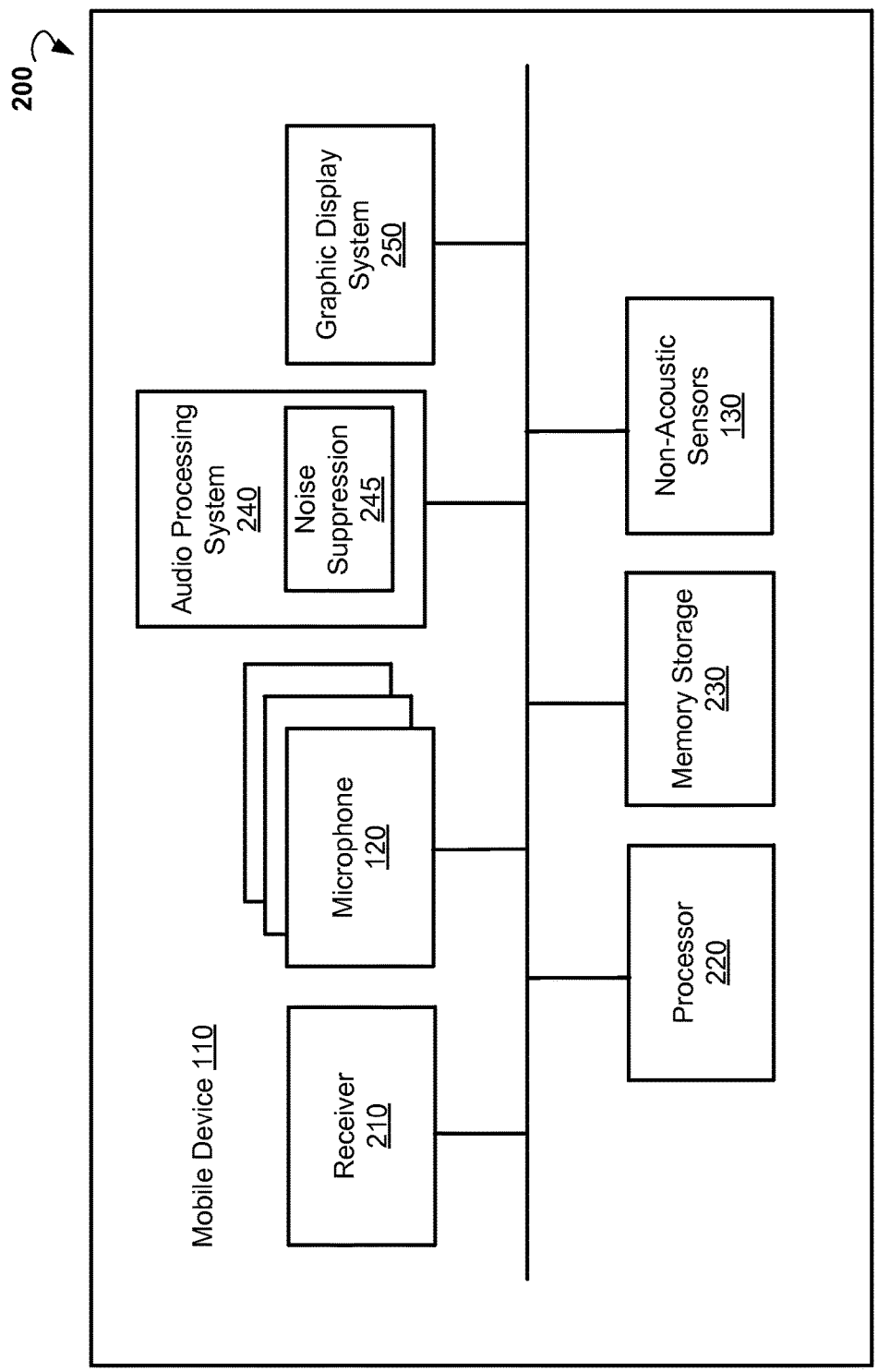
FIG. 2 is a block diagram showing a mobile device that can implement a method for performing operations of a mobile device and a method for training the mobile device, according to an example embodiment.

FIG. 2 is a block diagram 200 showing components of a mobile device 110, according to an example embodiment. Block diagram 200 provides exemplary details of a mobile device 110 of FIG. 1. In the illustrated embodiment, the mobile device 110 includes a receiver 210, one or more microphones 120, non-acoustic sensors 130, a processor 220, memory storage 230, an audio processing system 240, and a graphic display system 250. In other embodiments, the mobile device 110 includes additional or other components necessary for operations of mobile device 110. Similarly, the mobile device 110 can include fewer components that perform functions similar or equivalent to those depicted in FIG. 2.

The processor 220 includes hardware and/or software, which is operable to execute computer programs stored in a memory 230. The processor 220 is operable variously for floating point operations, complex operations, and other operations, including training a mobile device and performing personalized operations of a mobile device 110. In some embodiments, the processor 220 includes at least one of a digital signal processor, an image processor, an audio processor, a general-purpose processor, and the like.

The graphic display system 250 can be configured at least to provide a user graphic interface. In some embodiments, a touch screen associated with the graphic display system is utilized to receive an input from a user. Options can be provided to a user via an icon, text buttons, or the like in response to the user touching the screen in some manner.

The audio processing system 240 is configured to receive acoustic signals from an acoustic source via one or more microphone(s) 120 and process the acoustic signal components. In some embodiments, multiple microphones 120 are spaced a distance apart such that the acoustic waves impinging on the device from certain directions exhibit different energy levels at two or more microphones. After receipt by the microphone(s) 120, the acoustic signal(s) can be converted into electric signals. These electric signals can, in turn, be converted by an analog-to-digital converter (not shown) into digital signals for processing in accordance with some embodiments.

In various embodiments, where the microphone(s) 120 are omni-directional microphones that are closely spaced (e.g., 1-2 cm apart), a beamforming technique can be used to simulate a forward-facing and backward-facing directional microphone response. A level difference can be obtained using the simulated forward-facing and backward-facing directional microphone. The level difference can be used to discriminate speech and noise in, for example, the time-frequency domain, which can be used in noise and/or echo reduction. In some embodiments, some microphones are used mainly to detect speech and other microphones are used mainly to detect noise. In various embodiments, some microphones are used to detect both noise and speech.

In some embodiments, in order to suppress the noise, an audio processing system 240 includes a noise reduction module 245. The noise suppression can be carried out by the audio processing system 240 and noise reduction module 245 of the mobile device 110 based on inter-microphone level difference, level salience, pitch salience, signal type classification, speaker identification, and so forth. An example audio processing system suitable for performing noise reduction is discussed in more detail in U.S. patent Ser. No. 12/832,901, titled "Method for Jointly Optimizing Noise Reduction and Voice Quality in a Mono or Multi-Microphone System, filed on Jul. 8, 2010, the disclosure of which is incorporated herein by reference for all purposes. By way of example and not limitation, noise reduction methods are described in U.S. patent application Ser. No. 12/215,980, entitled "System and Method for Providing Noise Suppression Utilizing Null Processing Noise Subtraction," filed Jun. 30, 2008, and in U.S. patent application Ser. No. 11/699,732, entitled "System and Method for Utilizing Omni-Directional Microphones for Speech Enhancement," filed Jan. 29, 2007, which are incorporated herein by reference in their entireties.

Figure 3:
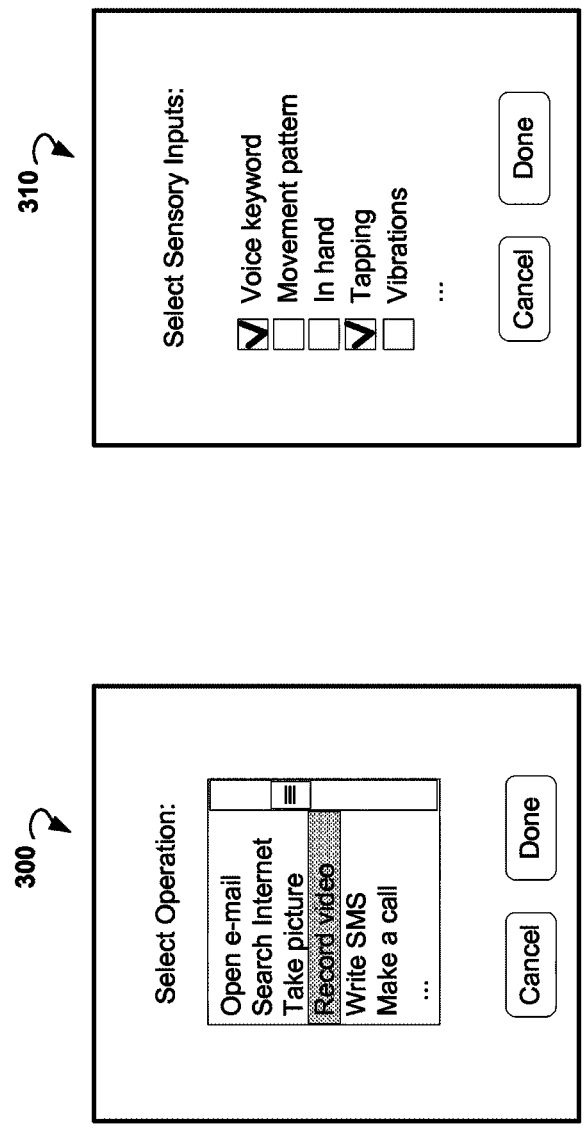
FIGS. 3A and 3B are block diagrams showing screens of an application for training a mobile device, according to an example embodiment.

FIG. 3A is a block diagram 300 showing a first screen of an application for training a mobile device, according to an example embodiment. In the first screen, a user can be asked to select an operation for which he or she wants to create a personalized signature to perform the operation. The examples of the operations can include "open e-mail", "search internet", "take picture", "record video", "write SMS", "make a call", and the like. After selecting the operation, the training application can display to the user a second screen for selection of a combination of audio and non-acoustic sensory inputs to be used for generation of a complex signature associated with the selected operation.

FIG. 3B is a block diagram 310 showing the second screen of an application for training a mobile device. The user can be asked to select a type of audio and non-acoustic sensory inputs to generate the personalized signature associated with selected operation. The inputs may include, for example, "voice keyword", "movement pattern", "in hand" (e.g., holding the device in hand), "tapping" (e.g., tapping the screen), "vibrations", "voice key phrase", and the like. In some embodiments, alternatively or additionally, using a screen similar to that described in FIG. 3B, the user can be asked to select one or more sensors that can be used to record the sensory inputs. For example, the user can be asked to select an accelerometer, a gyroscope, a magnetometer, or other physical sensors to detect a motion pattern.

After selecting the one or more options for sensory inputs, the training application can ask the user to enter an audio input by uttering a keyword, a key phrase, or providing a particular sound (e.g., whistling or clapping) one or several times. The audio input can be saved for the comparison with future audio inputs. Upon accepting the audio input, the user can be asked to provide a sensory input one or more times until the particular sensory input is recognized. The sensory input may include a special gesture, for example, tapping the mobile device in a specific place while holding the mobile device "in hand" or not holding the mobile device "in hand". The tapping can include touching the mobile device a specific number of times using, for example, a specific rhythm. In certain embodiment, the user may enter a motion pattern by performing a special motion of the mobile device while holding the mobile device "in hand". For example, the motion pattern can includes a rotation of the mobile device clockwise or counterclockwise, making imaginary circles clockwise or counterclockwise, drawing an imaginary "figure eight", a cross sign, and the like.

In some embodiments, the user can be allowed to specify a minimal and/or maximal window of a time between entering an audio input and a sensory input. The window of time can be used further in a user interface to allow the user to enter an audio first and the motion gesture/signature after the audio. Upon completing training the mobile device, the combination of audio and the sensory inputs can be associated with selected operation of the mobile device.

Figure 4:
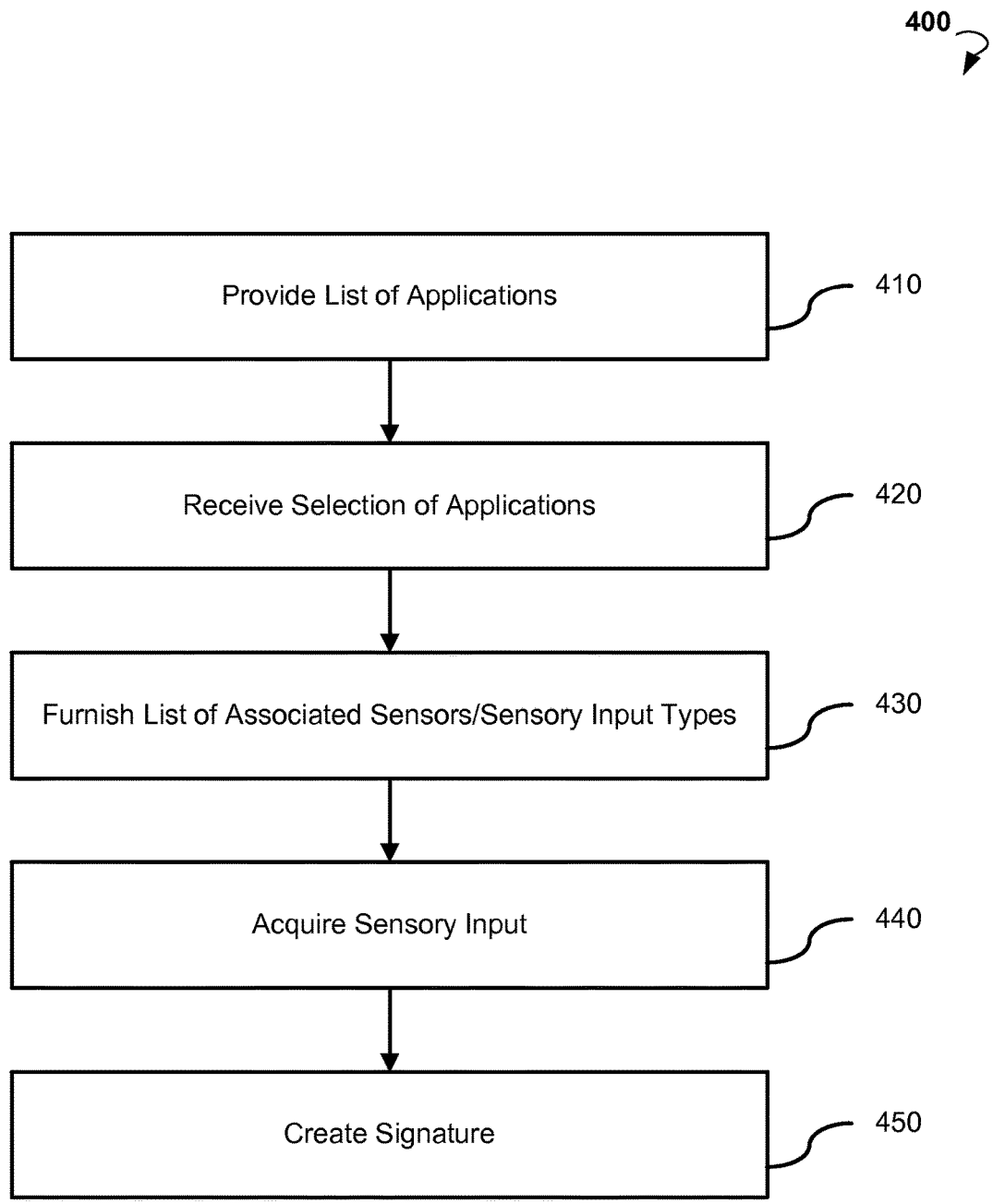
FIG. 4 is a flowchart showing steps of a method for training a mobile device, according to an example embodiment.

FIG. 4 illustrates a simplified flow diagram of a method 400 for training a mobile device, according to some example embodiments. At Step 410, a list of Applications is provided to a user. For example, a mobile device can provide, via a "Training GUI", a list of actions associated with applications (e.g., open camera, make a phone call, perform internet search, and navigate to a destination) in one screen of the training program.

At Step 420, a selection of application(s) can be received. For example, the user can select application(s) for which he/she wants to define a "sensory trigger" (e.g., by checking it on the screen by touching the icon, for example). Once the user indicates that he/she wants to train the mobile device on launching a trigger for that particular application, another screen can be invoked, according to various embodiments.

At Step 430, a list of sensors (or a type of sensory input encompassing one or more sensors) can be furnished. For example, after the user checks the ones he/she wants to use, he/she can press the "done" icon, and, in response, the mobile device can start a training period. During the training period, the user can, for a period of time, perform a combined sensory activation in order to train the mobile device. Auditory inputs can include a key word or a key phrase provided by the user during the training. In some embodiments, sensory activation can be accomplished using a combination of auditory inputs (e.g., from a microphone or another transducer) and at least one non-auditory inputs (e.g., from a proximity sensor such as an infrared sensor, a gyroscope, an accelerometer, a magnetometer, a complex detection, and the like).

At Step 440, input(s) from selected sensor(s) are recorded for a predetermined amount of time. The user can be prompted to move and/or position the mobile device one or more times. The sensor data can represents the motion and/or positioning performed by the user.

At Step 450 of this example, the one or more recordings of sensor data can be combined to create a signature. The signature can be associated with the motion and/or positioning performed by the user. For example, the application "launch video camera" can be chosen for training in a first screen and the user can select both "in hand" and "voice command" in a second screen. After the selection is performed (e.g., "Done" button pressed), the user can hold the mobile device in his/her hand and utter the voice command he/she wants to use/associate with "open video". A processor of the mobile device may record the voice command. Simultaneously or nearly simultaneously, the mobile device may record the readings received from the accelerometer/vibration/other physical sensors associated with mobile device within the same time interval as the spoken command, in order to associate the user input with an event of the user physically holding the mobile device. In various embodiment, the training program provides a certain period of time for recording. Upon expiration of the period of time for recording, the user can be provided, via the graphical user interface (GUI), a message asking the user to repeat the voice command one or few more times until a sufficient correlation is found.

The training program can keep a combination of the two (or more) "signatures" as a user defined trigger for the selected application(s). For example, after training, if the user says "open video" without holding the mobile device (e.g., phone), the command will be ignored (which is useful as the user may be talking to someone and not on the mobile device). In contrast, if the user utters the command while holding the mobile device, the mobile device can switch from a listening mode to launching a video recording application and start video recording. Although certain examples refer to the mobile device as a phone, it should be appreciated that the mobile device can be other than a phone, other examples being described in further detail herein.

In another example, the user can select application "make a call" and select vibration sensing as well as a voice command. Similarly to the example above, the user may want to tap the mobile device in a particular way while saying "call". In this example, once the user selects "Done" on the second GUI screen, he/she can tap the mobile device a number of times (e.g., three times) while saying the word "call". The mobile device can record the tapping sequence "signature" and the voice command that the user chose to record (in this case the word "call"), and a combination of these can be used in the future to cause the mobile device to launch the call screen. This approach allows the mobile device (e.g., one that always "listens" via its non-acoustic sensors and microphones) to ignore the word "call" that may be used in a normal conversation. However, if the user taps the mobile device in a certain way (e.g., three times) and utters voice command "call," the trained mobile device can recognize the trained combination and trigger the application immediately.

Figure 5:
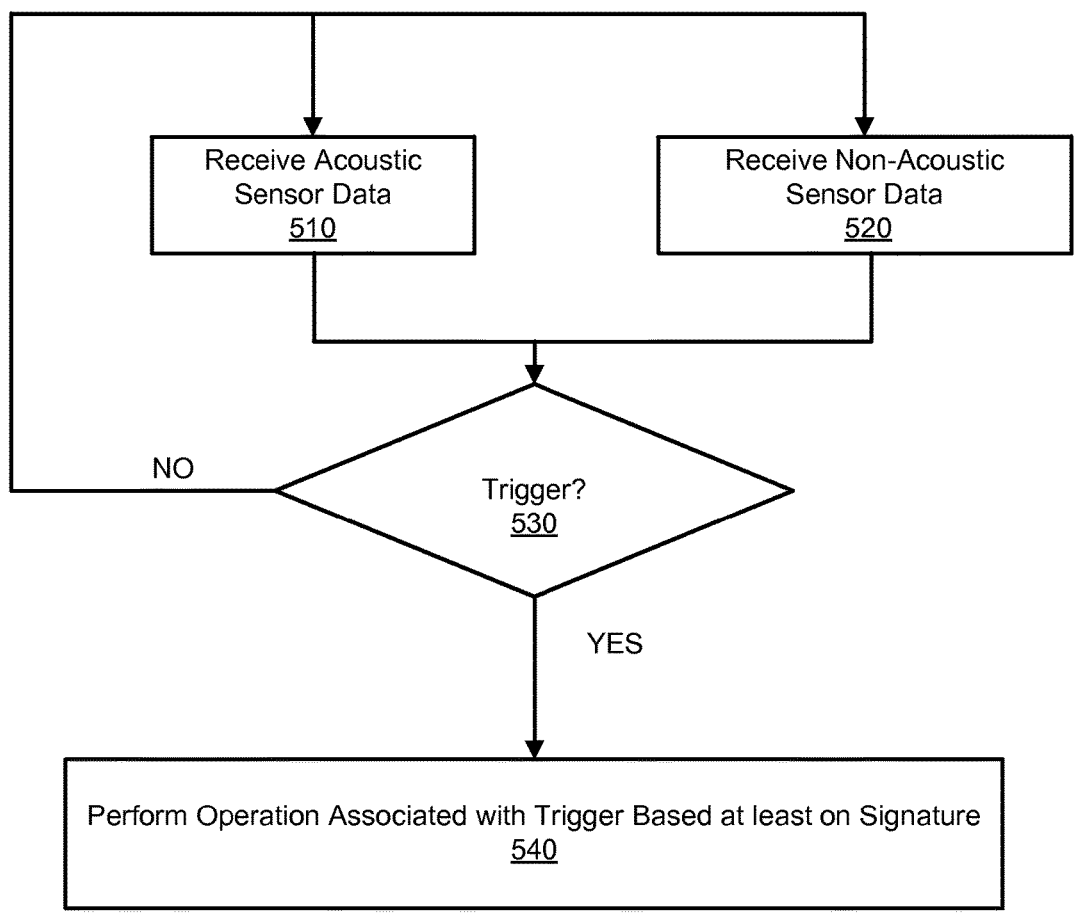
FIG. 5 is a flowchart showing steps of a method for performing operations of a mobile device, according to an example embodiment.

FIG. 5 illustrates a simplified flow diagram of a method 500 for providing a personalized operation of a mobile device using acoustic and non-acoustic sensor information, according to some example embodiments. At Step 510, acoustic sensor data can be received. The acoustic sensor data can be provided by one or more transducers (e.g., microphone 120). The acoustic sensor data can include, for example, a key word or a key phrase. Automatic speech recognition (ASR) may be performed on the acoustic sensor data. In some embodiments, the acoustic sensor data is processed (e.g., noise reduction/suppression/cancellation, echo cancellation, and the like) prior to performing the ASR.

At Step 520, non-acoustic sensor data can be received, for example, from various non-acoustic sensors listed herein and the like.

The non-acoustic sensor data can be used for complex detections, such as "in hand." When the user holds the mobile device, the mobile device can vibrate at a frequency that is in tune with the user's body and how the user holds the mobile device. The resulting very low frequency vibration can be distinct and different from the frequency generated when, for example, the mobile device is at rest on a table.

For example, the user can tap on the mobile device causes the mobile device to accelerate in a certain way. Indicators used to determine whether the tapping occurs can include the number of taps, frequency, and force. By way of further example, holding the mobile device as if the user were taking a picture and uttering a key word or a key phrase can launch a camera application for taking pictures.

At Step 530, the acoustic sensor data and the non-acoustic sensor data can be compared to the signature created during the training in order to determine whether a trigger exists. When the acoustic sensor data and the non-acoustic sensor data received within some period of time match the signature created during the training and there exists a trigger, the method proceeds to Step 540. When there is no trigger, the method returns to Steps 510 and 520.

At Step 540, the mobile device can performs an operation (e.g., run an application) corresponding to the matched trigger. Operations can include, for example, open mail, conduct search (e.g., via Google and the like), take a picture, record a video, send a text, maps/navigation, and the like.

It should be noted that, in some alternative implementations, the functions noted in the blocks of FIGS. 4 and 5 may occur out of the order noted in the figures. For example, two blocks shown in succession may, in fact, be executed substantially concurrently, or the blocks may sometimes be executed in the reverse order, depending upon the functionality involved.

Figure 6:
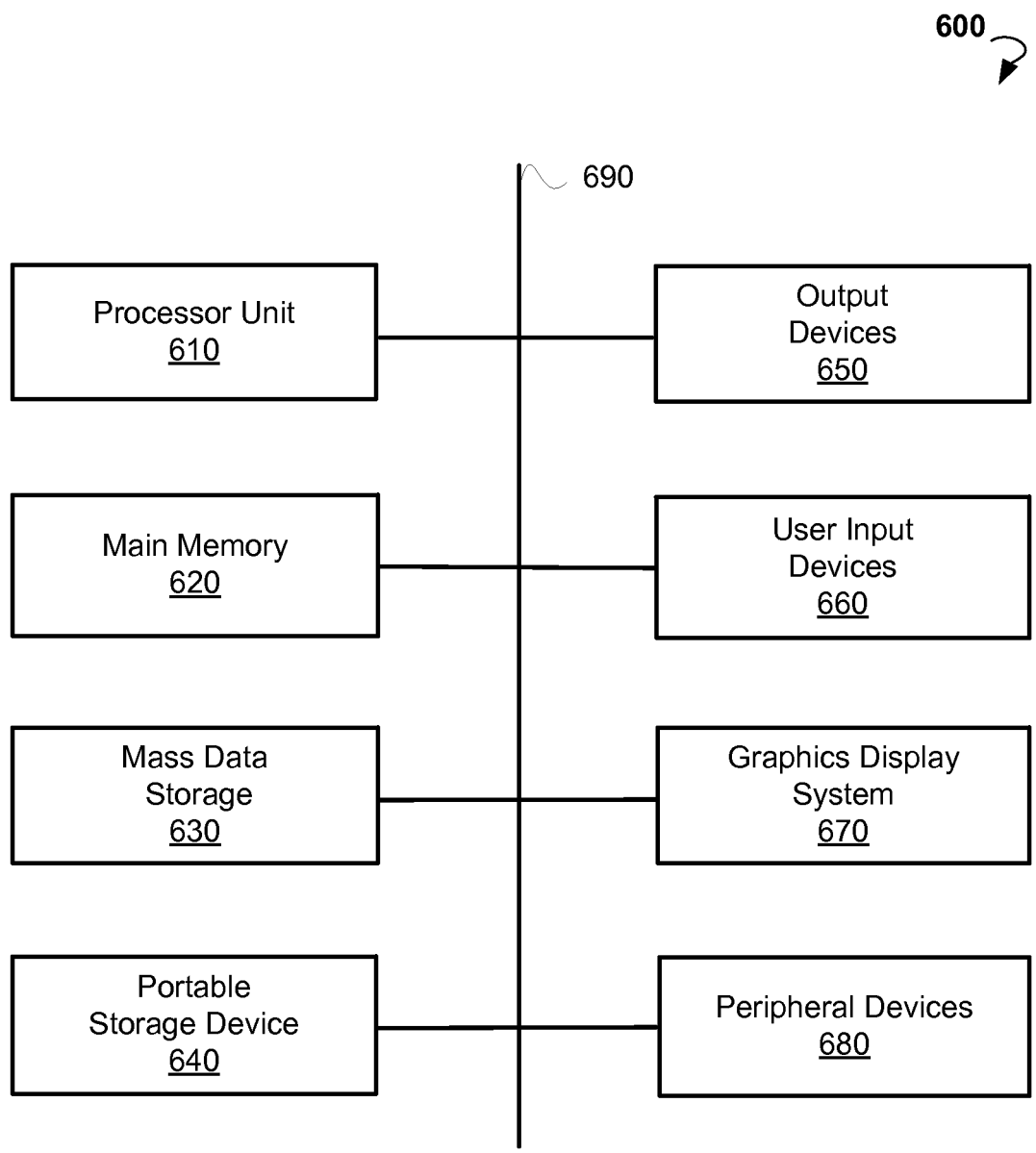
FIG. 6 is block diagram of an example computer system that can be used to implement embodiments of the present disclosure.

FIG. 6 illustrates an exemplary computer system 600 that may be used to implement some embodiments of the present invention. The computer system 600 of FIG. 6 may be implemented in the contexts of the likes of computing systems, networks, servers, or combinations thereof. The computer system 600 of FIG. 6 includes one or more processor units 610 and main memory 620. Main memory 620 stores, in part, instructions and data for execution by processor units 610. Main memory 620 stores the executable code when in operation, in this example. The computer system 600 of FIG. 6 further includes a mass data storage 630, portable storage device 640, output devices 650, user input devices 660, a graphics display system 670, and peripheral devices 680.

The components shown in FIG. 6 are depicted as being connected via a single bus 690. The components may be connected through one or more data transport means. Processor unit 610 and main memory 620 is connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 of FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 600 is implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for performing operations of a mobile device, the method comprising:
   determining that a signature has been received, the signature being a combination of an acoustic input and a non-acoustic input, the non-acoustic input including at least vibrations due to being held by a hand, wherein the determining that the signature has been received comprises:
      comparing the acoustic input to a user-defined acoustic input sample; and
      comparing the non-acoustic input to a user-defined non-acoustic input sample;
   in response to the determination, performing operations of the mobile device, the operations being associated with the signature;
   training the mobile device to perform the operations, the training comprising:
      presenting lists of one or more applications associated with the operations and one or more sensor types via a user interface of the mobile device;
      receiving a selection of one or more applications and one or more sensor types from a user via the user interface;
      recording acoustic data and non-acoustic sensor data based at least on the one or more sensor types selected by the user via the user interface; and
      generating the signature based at least on the acoustic data and non-acoustic sensor data, the signature being a user-defined signature, the user-defined signature being a combination of the user-defined acoustic input sample and the user-defined non-acoustic input sample; and
   associating the generated signature with the selection of one or more applications.

2. The method of claim 1, wherein the acoustic input includes a voice sound.

3. The method of claim 2, wherein the voice sound includes at least a spoken keyword, the spoken keyword being used to identify the operations.

4. The method of claim 2, wherein the acoustic sound is captured by at least one microphone of the mobile device.

5. The method of claim 1, wherein the non-acoustic input is detected by one or more sensors associated with mobile device, the sensors including one or more of the following: an accelerometer, a gyroscope, a magnetometer, and a proximity sensor.

6. The method of claim 1, wherein the signature further includes a predetermined window of time between the acoustic input and non-acoustic input.

7. A system for performing operations of a mobile device, the system comprising:
   a processor; and
   a memory communicatively coupled with the processor, the memory storing instructions which when executed by the processor performs a method comprising:
      determining that a signature has been received, the signature being a combination of an acoustic input and non-acoustic input, the non-acoustic input including at least vibrations due to being held by a hand, wherein the determining that the signature has been received comprises:
  comparing the acoustic input to a user-defined acoustic input sample; and
  comparing the non-acoustic input to a user-defined non-acoustic input sample;
in response to determination, performing operations of the mobile device, the operations being associated with the signature;
training the mobile device to perform the operations, the training comprising:
  presenting lists of one or more applications associated with the operations and one or more sensor types via a user interface of the mobile device;
  receiving a selection of one or more applications and one or more sensor types from a user via the user interface;
  recording acoustic data and non-acoustic sensor data based at least on the one or more sensor types selected by the user via the user interface; and
  generating the signature based at least on the acoustic data and non-acoustic sensor data, the signature being a user-defined signature, the user-defined signature being a combination of the user-defined acoustic input sample and the user-defined non-acoustic input sample; and
associating the generated signature with the selection of one or more applications.

8. The system of claim 7, wherein the acoustic input includes a voice sound captured by at least one microphone of the mobile device.

9. The system of claim 8, wherein the voice sound includes at least one spoken keyword, the at least one spoken keyword being used to identify the operations.

10. The system of claim 7, wherein the non-acoustic input is detected by one or more of sensor associated with the mobile device, the one or more sensors including one or more of the following: an accelerometer, a gyroscope, a magnetometer, and a proximity sensor.

11. The system, of claim 7, wherein the signature further includes a predetermined window of time between the acoustic input and non-acoustic input.

12. A non-transitory computer-readable storage medium having embodied thereon instructions, which when executed by one or more processors, perform steps of a method, the method comprising:
  determining that a signature has been received, the signature being a combination of an acoustic input and a non-acoustic input, the non-acoustic input including at least vibrations due to being held by a hand, wherein the determining that the signature has been received comprises:
    comparing the acoustic input to a user-defined acoustic input sample; and
    comparing the non-acoustic input to a user-defined non-acoustic input sample;
  in response to the determination, performing operations of the mobile device, the operations being associated with the signature;
  training the mobile device to perform the operations, the training comprising:
    presenting lists of one or more applications associated with the operations and one or more sensor types via a user interface of the mobile device;
    receiving a selection of one or more applications and one or more sensor types from a user via the user interface;
    recording acoustic data and non-acoustic sensor data based at least on the one or more sensor types selected by the user via the user interface; and
    generating the signature based at least on the acoustic data and non-acoustic sensor data, the signature being a user-defined signature, the user-defined signature being a combination of the user-defined acoustic input sample and the user-defined non-acoustic input sample; and
  associating the generated signature with the selection of one or more applications.

13. The method of claim 1, wherein determining that the signature has been received includes detecting a frequency of the vibrations.

14. The system of claim 7, wherein determining that the signature has been received includes detecting a frequency of the vibrations.

15. The non-transitory computer-readable storage medium of claim 12, wherein determining that the user-defined signature has been received includes detecting a frequency of the vibrations.

16. The method of claim 1, wherein determining that the signature has been received further includes detecting a number of taps in a tapping of the mobile device.

* * * * *